US008724930B2

(12) United States Patent
Tang

(10) Patent No.: US 8,724,930 B2
(45) Date of Patent: May 13, 2014

(54) COPYING SYSTEM AND METHOD

(75) Inventor: Ding-Yuan Tang, Pleasanton, CA (US)

(73) Assignee: ABBYY Development LLC (RU)

( * ) Notice: Subject to any disclaimer, the term of this patent is extended or adjusted under 35 U.S.C. 154(b) by 1016 days.

(21) Appl. No.: 12/476,131

(22) Filed: Jun. 1, 2009

(65) Prior Publication Data
US 2009/0304305 A1 Dec. 10, 2009

Related U.S. Application Data

(60) Provisional application No. 61/057,643, filed on May 30, 2008.

(51) Int. Cl.
*G06K 9/20* (2006.01)
*G06K 9/64* (2006.01)

(52) U.S. Cl.
USPC ............................................. 382/321; 382/217

(58) Field of Classification Search
USPC ................... 382/321, 183, 217, 218, 254, 312
See application file for complete search history.

(56) References Cited

U.S. PATENT DOCUMENTS

| 5,930,393 | A  | * | 7/1999 | Ho et al. ........................ 382/225 |
| 7,421,126 | B2 | * | 9/2008 | Deere ............................ 382/181 |
| 7,475,061 | B2 | * | 1/2009 | Bargeron et al. ..................... 1/1 |
| 7,525,694 | B2 | * | 4/2009 | Nishida ......................... 358/462 |
| 7,889,925 | B2 | * | 2/2011 | Topper .......................... 382/181 |
| 2004/0081332 | A1 | * | 4/2004 | Tuttle et al. .................... 382/100 |
| 2010/0149322 | A1 | * | 6/2010 | Lev ............................... 348/61 |

* cited by examiner

*Primary Examiner* — Yon Couso
(74) *Attorney, Agent, or Firm* — LeighAnn Weiland; Aditya Krishnan

(57) ABSTRACT

Embodiments of the present invention disclose a copying method that combines optical character recognition (OCR) technology and a search in order to improve the quality of a copy despite the presence of degrading factors. In one embodiment, the search comprises an Internet search and is used to reconstruct/enhance the copy digitally before outputting the copy to print or some other digital medium. Advantageously, a copy produced using the techniques of the present invention may be at least equal to if not better than the original document copied.

22 Claims, 4 Drawing Sheets

COPYING SYSTEM AND METHOD

This application claims the benefit of priority to U.S. 61/057,643, filed May 30, 2008, the specification of which is hereby incorporated by reference.

FIELD

Embodiments of the present invention relate to a method and system for digital copying and printing

BACKGROUND

Creating a quality reproduction of a document in today's office environment is generally done through a copier or multi-function printer equipped with a scanning interface. Several factors can lead to inferior copies. These include dirt on the scanning equipment, a defective scanning sensor, as well as defects in the original document such as pen marks, stains, etc. These factors will be referred to herein as "degrading factors".

SUMMARY

Embodiments of the present invention disclose a copying method that combines optical character recognition (OCR) technology and a search in order to improve the quality of a copy despite the presence of degrading factors. In one embodiment, the search comprises an Internet search and is used to reconstruct/enhance the copy digitally before outputting the copy to print or some other digital medium. Advantageously, a copy produced using the techniques of the present invention may be at least equal to if not better than the original document copied.

A system implementing the copy method is also disclosed.

Other aspects of the invention will become apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose a copying method that combines optical character recognition (OCR) technology and a search in order to improve the quality of a copy despite the presence of degrading factors. In one embodiment, the search comprises an Internet search and is used to reconstruct/enhance the copy digitally before outputting the copy to print or some other digital medium. Advantageously, a copy produced using the techniques of the present invention may be at least equal to if not better than the original document copied.

Figure 1:
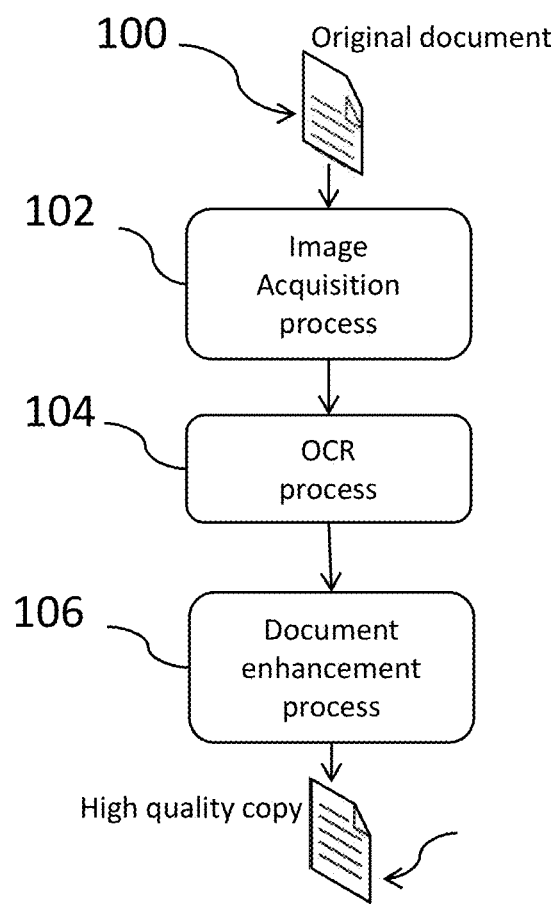
FIG. 1 shows a flowchart of a copying process, in accordance with one embodiment of the invention.

Referring now to FIG. 1 of the drawings, the broad steps involved in the copying method are shown. As will be seen, the original document 100 is subjected to an image acquisition process 102, a OCR process 104, and a document enhancement process 106. The result is a high quality copy 108 of the original document 100.

Figure 2:
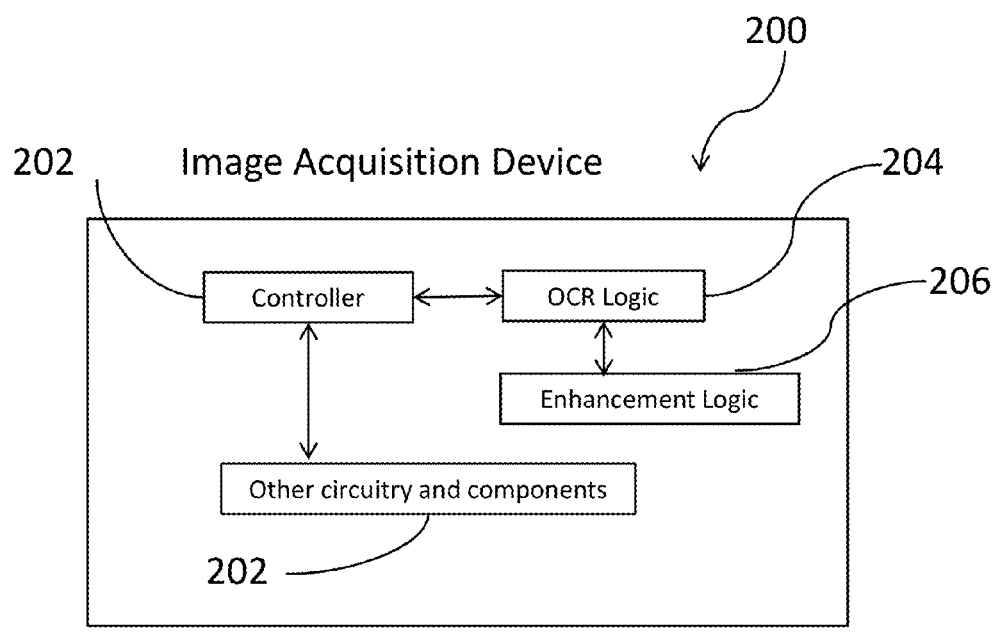
FIG. 2 shows a high-level block diagram of a system for implementing the copying process, in accordance with one embodiment of the invention.

Referring now to FIG. 2 of the drawings, there is shown a high-level block diagram of a system 200 for implementing the copying method, in accordance with one embodiment. The system 200 may represent any capture or image acquisition device such as a digital copier, scanner, digital camera, etc. The system 200 includes many components that need not be shown in order to gain a full and thorough understanding of the present invention. These components will be known to one of ordinary skill in the art and are indicated by the block 202 in FIG. 2. The block 202 represents the other circuitry and components that are required for the system 200 to function as an image capture device. For example, the other circuitry and components will include an optical subsystem to capture an image. A controller 204 controls the various components of the system 200. Additionally, the system 200 includes OCR logic 206, and enhancement logic 208. The OCR logic 206 performs the OCR process 104, and the enhancement logic 208 performs the document enhancement process 106.

The OCR logic 204, and the enhancement logic 206 may comprise software and/or firmware components. The OCR logic 206 includes processing blocks to implement an OCR process to recognize text in a document image. As such, the OCR logic 206 includes an OCR algorithm/search engine capable of performing document analysis to determine the components of a document and to conduct its components to ASCII text.

The enhancement logic 206 includes a search function to perform a search in order to enhance or augment the OCR process, as will be described.

In the system 200, the OCR logic 204, and the enhancement logic 206 are embedded within the capture device. In alternative embodiments, the OCR logic 204, and the enhancement logic 206 may reside as components on a server. The server may then be coupled by means of a data connection to an image acquisition device in the form of a scanner, digital camera, etc. in order to obtain a document image from the image acquisition device. In such embodiments, it is the server that performs the OCR process 104, and the document and the document enhancement process 106.

Referring again to FIG. 1 of the drawings, the image acquisition process 102 is the process whereby a digital image of the original document is acquired. The process 102 may be performed by a variety of capture devices such as a digital copier, scanner, digital camera, etc.

The document image captured by the image acquisition process 102 is in a pixel format. The OCR process 104, and the document enhancement process 106 are performed to convert the document image to a digital format, as will be described.

In accordance with embodiments of the present invention, the following steps are performed as part of the OCR process 104:

(a) The document image is analyzed by an OCR algorithm/engine. In particular the page structure of the image is analyzed to determine the components on the page such as text components and picture/image components. The OCR algorithm subsequently converts the image of any text components from pixel format into ASCII format while preserving any picture components on the page in pixel format and retaining the document structure.

(b) In one embodiment, any degrading factors or imperfections on the page image whether it is a defect resulting from the scanning process or a defect on the paper document are also detected by the OCR system and some text recognition errors may be repaired by using the linguistic capabilities or image enhancement features inside the OCR engine.

The document enhancement process 106 is performed if the document image contains parts that are beyond the ability of the OCR algorithm/engine to correct or the OCR algorithm/engine cannot recognize. For the document enhancement process 106 the system is provisioned with a search capability to perform a lookup on the World Wide Web (Internet) or corporate network as a means to repair the document. For this embodiment, output from the OCR process is fed into a search engine so that it can be matched with existing digital content on the Internet or the corporate network.

Once matching content is found, the corresponding text or the image components in the document image can be selectively replaced using the matching content. Thus, for example, miss-recognized word, sentences, pictures, etc. may be replaced. In, some embodiments the content of the entire document image may be replaced. In one embodiment, for any major replacement done, the system will generate a signal to a user to indicate that the document has been digitally repaired or enhanced.

Figure 3:
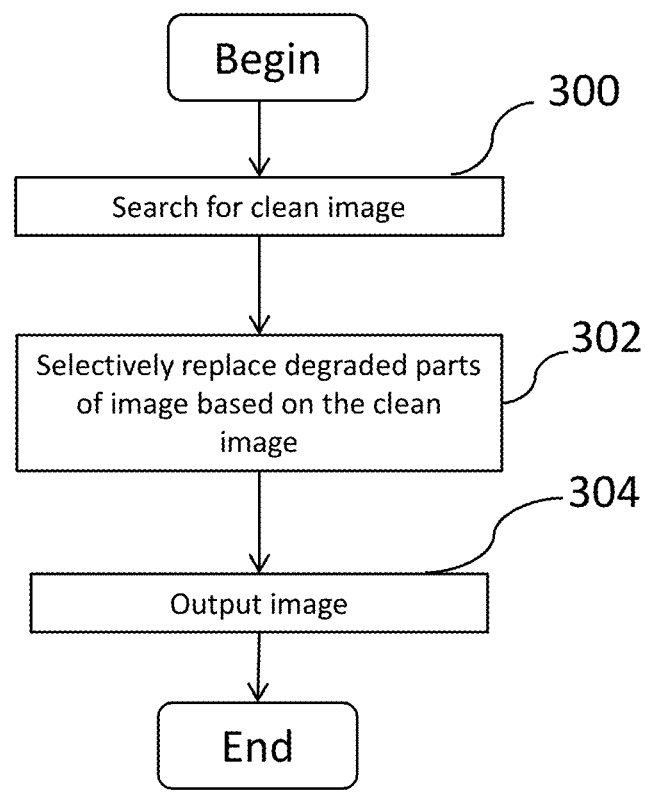
FIGS. 3 and 4 show flowcharts of processes performed by the system of FIG. 2, in accordance with one embodiment of the invention.

By virtue of that document enhancement process 106 the system 200 performs a process illustrated by the flowchart of FIG. 3, in one embodiment. Referring to FIG. 3, if a document/page contains degrading factors (in one embodiment, the presence of degrading factors may be indicated by the quality of the OCR output) then a search is performed for a "clean" image corresponding to the document image. A clean image is one that does not contain the presence of degrading factors. As noted above, the search may be performed through sources available on the World Wide Web or Internet. Alternatively, the search may be performed through sources within a corporate intranet.

At block 302, degraded parts of the document image are selectively replaced with corresponding "clean" parts obtained through the search.

At block 304, an image corresponding to the document is output. In one embodiment, the system generates an electronic file which can either be printed or exported in an accessible electronic format to be repurposed elsewhere.

Figure 4:
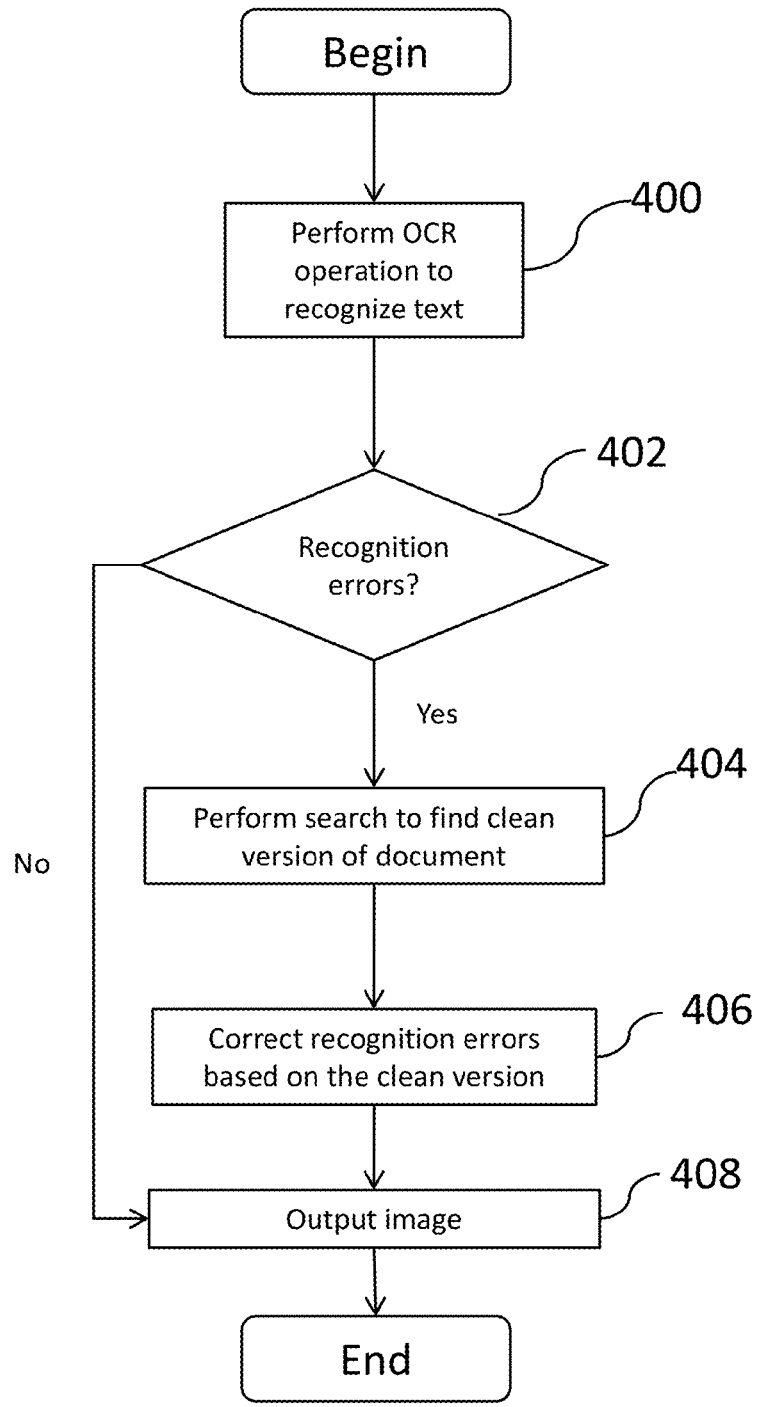

By virtue of the OCR process 104, and the document enhancement process 106, the system 200 performs the process illustrated by the flowchart of FIG. 4, in one embodiment. Referring to FIG. 4, at block 400 and OCR operation is performed to recognize text in a document image. At block 402, if they are recognition errors in the OCR operation that are beyond or greater than a predetermined threshold or error rate then control passes to block 404, otherwise control passes to block 400, where the document is output as an output image. It is to be noted that said recognition errors in the OCR operation may be due to the presence of degrading factors in the original document. For descriptive convenience, portions of the document image that have recognition errors beyond the predetermined threshold will be referred to as "suspect text".

At block 404, the system performs a search, as described above, to find a clean version of the document. At block 406, the suspect text is corrected based on the clean version. In one embodiment, this may include selectively replacing the suspect text with its equivalent from the clean version.

If the user is looking to copy the original document, the system will print a copy through a PostScript command, in one embodiment. Advantageously, because the source of the printing is the electronic file containing ASCII text and image rastered to meet the printing resolution of the printing device (e.g. 600 DPI for laser printer), it is free defects which is associated from the capture process such as pixilated image and generation effects from subsequent copies.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method, comprising:
   acquiring, by a computer device, an input image corresponding to a paper-based document;
   performing optical character recognition (OCR) of the input image for producing a recognized text, said recognized text being computer encoded and corresponding to the input image, wherein a first portion of the recognized text includes imperfections and a second portion of the recognized text lacks imperfections;
   performing a search using the second portion of the recognized text to obtain an encoded text corresponding to the first portion of the recognized text, wherein the encoded text is free from imperfections; and
   generating an output based on the recognized text by replacing the first portion of the recognized text with the obtained encoded text.

2. The method of claim 1, wherein the input image is acquired by one of copying and scanning.

3. The method of claim 1, wherein said imperfections are selected from the group consisting of dirt, stains, and markings.

4. A method, comprising:
acquiring an image corresponding to a document;
performing an optical character recognition (OCR) operation to recognize text in the image comprising:
encountering within the recognized text a portion of suspect text that cannot be recognized with a predetermined level of accuracy;
searching for and locating another instance of the document from a network accessible location across a corporate network, wherein the searching is performed at least in part based on the recognized text; and
substituting said portion of suspect text based on an equivalent portion of text from the located another instance of the document.

5. A system, comprising:
an image acquisition component configured to be able to acquire an image corresponding to a document;
a controller to control the image acquisition component;
a memory coupled to the controller and configured with logic to perform steps including:
recognize suspect text based on encoded text obtained via a search for another instance of the document, wherein the suspect text is a portion of the recognized text corresponding to the image corresponding to the document that fails to be recognized with a predetermined level of accuracy; and
replace the suspect text with its equivalent from the another instance of the document.

6. A computer-readable medium having stored thereon instructions which when executed by a system, cause the system to perform a method comprising:
performing an optical character recognition (OCR) operation to recognize text in an image corresponding to a document;
for a suspect portion of the recognized text that cannot be recognized by the OCR operation with a predetermined level of accuracy, performing a search for another instance of the document using a successfully recognized portion of the recognized text; and
replacing the suspect portion of the recognized text with its equivalent based on encoded text corresponding to the another instance of the document.

7. A method comprising:
performing document analysis by logic operating on electronic circuitry to determine components of a document that likely includes a text component;
converting a text component of said document to encoded text, wherein the converted text component includes at least one error;
determining that the converted text component that includes at least one error is a suspect text component; and
replacing said suspect text component with its equivalent text component based on a result from a search for said suspect component, wherein said search for said suspect component is based on the converted encoded text.

8. The method of claim 7, wherein said search for said suspect component is a search in an external data source.

9. The method of claim 7, wherein in the converted text component that includes at least one error is a suspect text component when the determining identifies that the at least one error exceed an error threshold.

10. The method of claim 1, wherein a user interface signal is activated indicating generation of the output.

11. The method of claim 1, wherein the output is an output image corresponding to the input image and a quality of the output image is better than a quality of the input image.

12. The method of claim 4, wherein the portion of suspect text that cannot be recognized with the predetermined level of accuracy comprises at least one misrecognized word, wherein said substituting said portion of suspect text comprises replacing the at least one misrecognized word with a corresponding word from the located another instance of the document.

13. The system of claim 6, wherein the search includes use of a portion of non-suspect text to locate the another instance of the document.

14. An image acquisition device comprising:
optical circuitry that is configured to acquire an image corresponding to a paper-based document, wherein the image includes text, wherein a first portion of the acquired text includes imperfections and a second portion of the acquired text is free from imperfections;
optical character recognition logic that is configured to attempt to recognize the first portion of the acquired text that includes imperfections and to recognize the second portion of the acquired text that is free from imperfections; and
enhancement logic that is configured
to obtain the recognized first portion of the acquired text that includes imperfections, the recognized second portion of the acquired text that is free from imperfections, and a digital document, wherein the digital document corresponds to the paper-based document,
to compare the recognized first portion of the acquired text that includes imperfections and the recognized second portion of the acquired text that is free from imperfections to the computer-encoded text contained in the digital document and,
in response to a match between the recognized first portion of the acquired text that includes imperfections, to replace a matching content of the first portion of the acquired text that includes imperfections with corresponding text from the digital document, and
to generate an electronic file having the replaced matching content of the recognized first portion of the acquired text having imperfections and the second portion of the acquired text that is free from imperfections.

15. The image acquisition device of claim 14, wherein the enhancement logic is configured to obtain the digital document from external data source.

16. The image acquisition device of claim 14, wherein the enhancement logic is configured to obtain the digital document from the Internet.

17. The method of claim 1 wherein the search comprises an Internet search.

18. The method of claim 1 wherein the search comprises a search of an external data source.

19. The system of claim 5 wherein the search comprises an Internet search.

20. The system of claim 5 wherein the search comprises a search of an external data source.

21. The method of claim 7 wherein the search comprises an Internet search.

22. The method of claim 7 wherein the search comprises a search of an external data source.

* * * * *